United States Patent
Boehm et al.

(10) Patent No.: US 7,540,151 B2
(45) Date of Patent: Jun. 2, 2009

(54) DRIVE DEVICE FOR A MOTOR VEHICLE

(75) Inventors: Martin Boehm, Munich (DE); Jan Velthuis, Landsberg (DE); Jan Tribulowski, Wolnzach (DE); Werner Verdoorn, Fuerstenfeldbruck (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 65 days.

(21) Appl. No.: 11/603,105

(22) Filed: Nov. 22, 2006

(65) Prior Publication Data

US 2007/0130948 A1 Jun. 14, 2007

(30) Foreign Application Priority Data

Nov. 24, 2005 (DE) ......................... 10 2005 055 996

(51) Int. Cl.
*F02B 37/00* (2006.01)
*F02B 37/013* (2006.01)
*F02B 37/12* (2006.01)
*F02B 37/007* (2006.01)

(52) U.S. Cl. ............................. 60/612; 60/611; 60/597; 123/562

(58) Field of Classification Search ........... 60/611–612, 60/602; 123/559–559.2, 562; *F02B 37/00, F02B 37/007, 37/013, 37/12*
See application file for complete search history.

(56) References Cited

U.S. PATENT DOCUMENTS

| 4,223,534 | A | * | 9/1980 | Annus | 60/611 |
| 4,959,961 | A | * | 10/1990 | Hiereth | 60/612 |
| 5,020,327 | A | * | 6/1991 | Tashima et al. | 60/612 |
| 5,277,029 | A | * | 1/1994 | Kidokoro et al. | 60/612 |
| 5,857,336 | A | * | 1/1999 | Paul et al. | 60/597 |
| 6,378,308 | B1 | * | 4/2002 | Pfluger | 60/612 |
| 2008/0178591 | A1 | * | 7/2008 | Axelsson et al. | 60/602 |

FOREIGN PATENT DOCUMENTS

DE 38 15 991 C1 7/1989

(Continued)

OTHER PUBLICATIONS

A translation Pub. No. DE 10 2004 028 482 A1.*

(Continued)

*Primary Examiner*—Thai-Ba Trieu
(74) *Attorney, Agent, or Firm*—Crowell & Moring LLP

(57) ABSTRACT

A drive device for a motor vehicle includes a multi-cylinder internal combustion engine and at least two exhaust gas turbocharger devices. At least one outlet valve is assigned to an exhaust gas turbocharger device of each cylinder of the internal combustion engine in such a manner that the exhaust gas duct assigned to this outlet valve is connected to the turbine wheel of the exhaust gas turbocharger device.

3 Claims, 2 Drawing Sheets

FOREIGN PATENT DOCUMENTS

| | | | |
|---|---|---|---|
| DE | 699 04 928 T2 | | 10/2003 |
| DE | 102 43 473 A1 | | 3/2004 |
| DE | 10 2004 028 482 A1 | | 12/2005 |
| EP | 0 120 351 B1 | | 10/1984 |
| EP | 0 334 206 B1 | | 9/1989 |
| EP | 1 645 735 A1 | | 4/2006 |
| JP | 61-164039 A | | 7/1986 |
| JP | 61210224 A | * | 9/1986 |
| JP | 62-174537 A | | 7/1987 |
| JP | 01285619 A | * | 11/1989 |
| JP | 06280586 A | * | 10/1994 |
| JP | 2001-012234 A | | 1/2001 |
| WO | WO 2005/068804 A1 | | 7/2005 |

OTHER PUBLICATIONS

Pub. No. DE 10 243 473 A1.*
A translation Patent No. JP 06 280 586 A.*
A translation Patent No. JP 01-285619 A.*
German Search Report dated Sep. 19, 2006 including English translation of pertinent portion (Nine (9) pages).

* cited by examiner

DRIVE DEVICE FOR A MOTOR VEHICLE

BACKGROUND AND SUMMARY OF THE INVENTION

This application claims the priority of German Application No. 10 2005 055 996.4, filed Nov. 24, 2005, the disclosure of which is expressly incorporated by reference herein.

The invention relates to a drive device for a motor vehicle having a multi-cylinder internal combustion engine, where each cylinder includes at least two outlet valves, where at least of one of the at least two outlet valves can be controlled in regard to its stroke, and at least two exhaust gas turbocharger devices are provided.

The most varied drive devices with an internal combustion engine and at least two exhaust gas turbocharger devices are already known. In the trade journal MTZ, 5/2005, Annual Edition 66, an internal combustion engine with two exhaust gas turbocharger devices connected in series has already been described under the title "Der neue BMW-Sechszylinder-Dieselmotor mit Stufenaufladung" [The New BMW Six-cylinder Diesel Motor with Variable Charging].

It is an object of the invention to provide a drive device having an internal combustion engine and at least two exhaust gas turbocharger devices that is improved in regard to the response behavior of the turbocharger devices. Furthermore, the drive device is intended to be improved with regard to the maximum power that can be produced by it.

According to the invention, the objective is achieved by providing a drive device including a multi-cylinder internal combustion engine, where each cylinder includes at least two outlet valves, where at least of one of the at least two outlet valves can be controlled in regard to its stroke, and at least two exhaust gas turbocharger devices are provided. At least one outlet valve of each cylinder is assigned to at least one exhaust gas turbocharger device in such a manner that the exhaust gas duct assigned to this outlet valve is connected to the turbine wheel of the exhaust gas turbocharger device. Further preferred embodiments of the invention are described and claimed herein.

According to the invention, it is provided to form each cylinder of the internal combustion engine with at least two outlet valves, where at least of one of the at least two outlet valves is formed as a valve (or valve drive) with variable stroke or with variable stroke and variable control time (variable valve timing). Furthermore, it is provided to assign to one of the at least two exhaust gas turbocharger devices of each cylinder at least one first outlet valve, and to assign to the other exhaust gas turbocharger device of each cylinder at least one other, second outlet valve. In so doing, the assignment is done by the assigned outlet valve being connected, via a separate outlet or exhaust gas duct, to the turbine wheel of the assigned exhaust gas turbocharger device. A plurality of outlet or exhaust gas ducts is provided per cylinder.

Preferably, a total of two exhaust gas turbocharger devices are present and each cylinder includes precisely two outlet valves (a variably controllable outlet valve and an outlet valve with at least fixed stroke curves or with fixed stroke and control time curves), where the non-controllable outlet valve of each cylinder is assigned to the first exhaust gas turbocharger device and the controllable outlet valve of each cylinder is assigned to the second exhaust gas turbocharger device. Advantageously, the one outlet valve or all the outlet valves of all the cylinders are variable with regard to their control time curves via a controllable displacement of the cam shaft (the outlet valves designated in the sense of the invention as controllable outlet valves as well as the outlet valves designated in the sense of the invention as non-controllable outlet valves). In the sense of the invention, a controllable outlet valve is understood to mean an outlet valve that is formed in such a manner that it can be controlled at least with regard to its stroke curve. The switching off of the controllable outlet valve is accomplished by the stroke of this outlet valve being set equal to zero.

In a preferred embodiment of the invention, the first exhaust gas turbocharger device is embodied as a so-called twin-scroll charger and the second exhaust gas turbocharger device is embodied as a so-called dynamic pressure charger. In motors with six or more cylinders, it can be reasonable to embody the second exhaust gas turbocharger device also as a twin-scroll charger in order to achieve, even for higher intake volume flows, a group separation of the cylinders on the exhaust gas side and thus to avoid the negative interaction of the cylinders thrusting out one after the other in the ignition sequence. With this, the residual gas content in the combustion space can be reduced and the requirement for charge pressure can be reduced. The exhaust gas turbocharger devices are preferably dimensioned differently, in particular the first charging device is formed for a low rotary speed range or a low volume flow via the compressor, and the second charging device is formed for a rotary speed range extending the first rotary speed range upwards or a greater volume flow via the compressor. In doing so, the rotary speed of the motor is only indirectly a measure for the difference of the two ranges. What is important here is the volume flow conducted via the compressor of the exhaust gas turbocharger unit, or the corresponding operating point in the characteristic diagram for the compressor (volume flow via the compressor over pressure ratio over the compressor). In the following we will refer to the volume flow over the compressor to distinguish the two ranges. Included in the sense of the invention are, however, all the parameters, such as, for example, the rotary speed of the motor, which correlate at least in operational subranges to the volume flow.

To increase the maximum power which can be generated by the internal combustion engine, the first exhaust gas turbocharger device is connected on the exhaust side of the turbine wheel to a series circuit of an initial catalytic converter and the principal catalytic converter, while the second exhaust gas turbocharger device is only conducted by the output side of its turbine wheel to the main catalytic converter.

Furthermore, a control device is provided which, in a lower volume flow range up to a predetermined volume flow threshold value, drives the controllable outlet valves in such a manner that they are in a closed position. In this lower volume flow range, the exhaust gas to be ejected from the cylinder combustion chambers is accordingly fed only via the outlet and exhaust gas ducts of the non-controlled outlet valves of a single exhaust gas turbocharger device (or the first exhaust gas turbocharger device). Thereby, it is achieved that, in the lower volume flow range only, one exhaust gas turbocharger device (in particular an exhaust gas turbocharger device of low mass, since this is designed exclusively for the lower rotary speed range) has to be accelerated and the compressor of this charging device moves in a characteristic diagram with better efficiency. A valve that can be driven by the control unit closes, in the lower volume flow range, the compressor outlet of the other compressor (compressor of the second exhaust gas turbocharger device) in order to prevent the outflow of the compressed intake air via the inactive compressor.

On overshoot of the predetermined volume flow threshold value, in an upper volume flow range, the controllable outlet valves are in addition driven in such a manner that also via their outlet and exhaust gas duct a part of the exhaust gas flow to be ejected can be conducted away. This partial exhaust gas flow is conducted to the second exhaust gas turbocharger device. Thereby it is achieved that, in an upper volume flow range, intake air can be additionally compressed and supplied to the cylinder combustion chambers. The maximum power is further increased since the exhaust gas counter pressure is reduced due to the initial catalytic converter not being present and thus the possible drops in pressure over the turbines of the exhaust gas turbocharger device and the efficiency of the combustion is improved by the reduction of the amount of residual gas.

Furthermore, a reduction of emissions is achieved through the invention since the catalytic converter temperature required for conversion is reached earlier after a cold start due to the reduction of masses to be heated up. During the catalytic converter heating phase the controllable outlet valve of the cylinders is closed in each case so that the volume flow is conducted via only one exhaust gas turbocharger device. The mass of this exhaust gas turbocharger device is less than that of a single large exhaust gas turbocharger, which would also have to be implemented by itself for the entire exhaust gas mass even at the nominal power point.

In the catalytic converter heating phase, the first exhaust gas turbocharger, which is preferably dimensioned to be smaller, is active and the second exhaust gas turbocharger, which is preferably dimensioned to be larger, is inactive. Due to the high exhaust gas enthalpy required for heating the catalytic converter device, the compressor of the first exhaust gas turbocharger can convey more intake air than the combustion motor needs. The excess intake air can be conducted away via the compressor of the second exhaust gas turbocharger device. The compressor of the second exhaust gas turbocharger device is thereby set in rotation. By the rotation it is prevented that the otherwise stationary, inactive exhaust gas turbocharger ceases to be oil-tight at the connecting shaft between the turbine and compressor.

Other objects, advantages and novel features of the present invention will become apparent from the following detailed description of the invention when considered in conjunction with the accompanying drawings.

BRIEF DESCRIPTION OF THE DRAWINGS

FIG. 1 shows, represented schematically, a drive device for a motor vehicle according to the invention, while

DETAILED DESCRIPTION OF THE DRAWINGS

Figure 1:
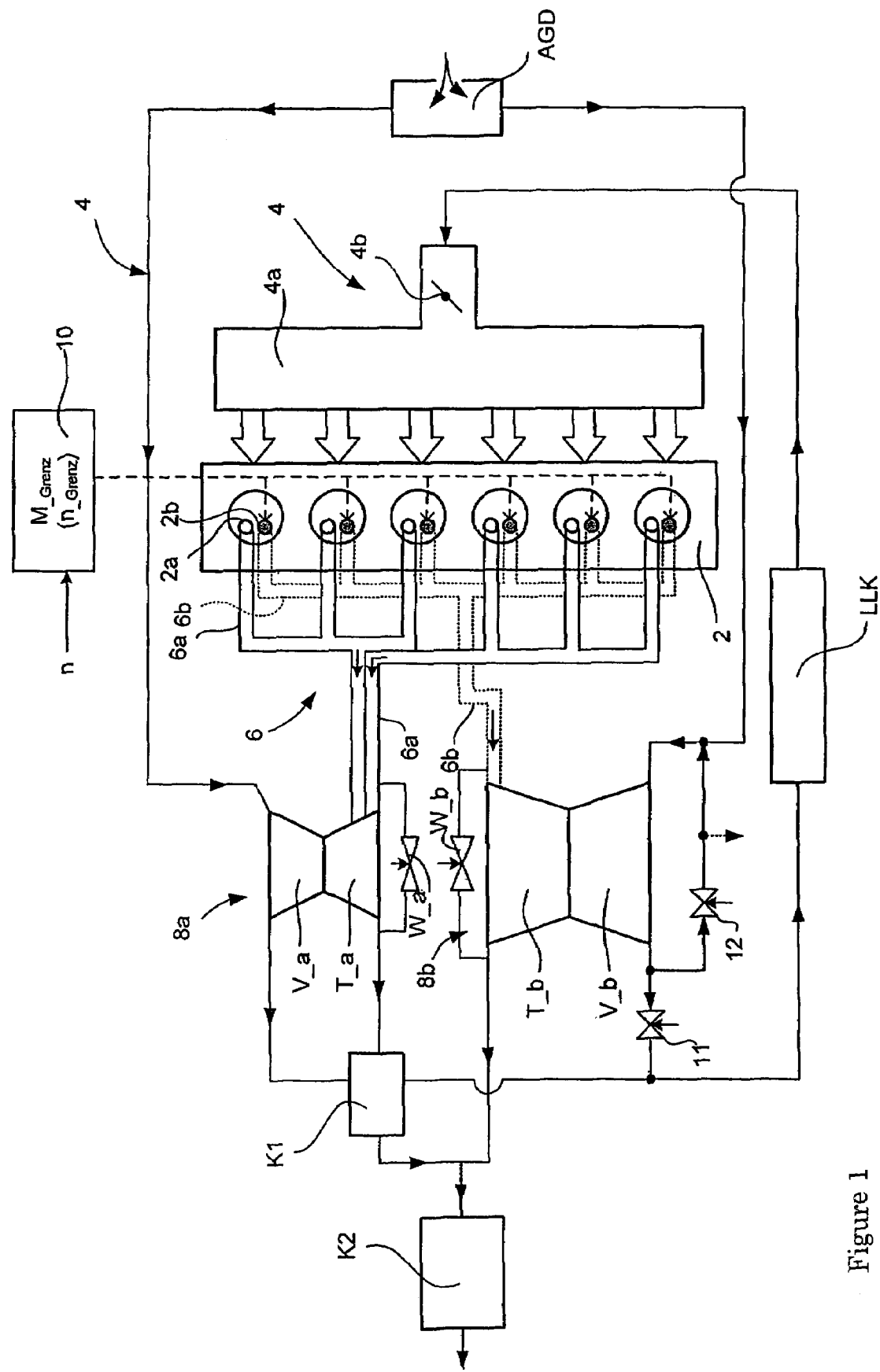
Figure 2:
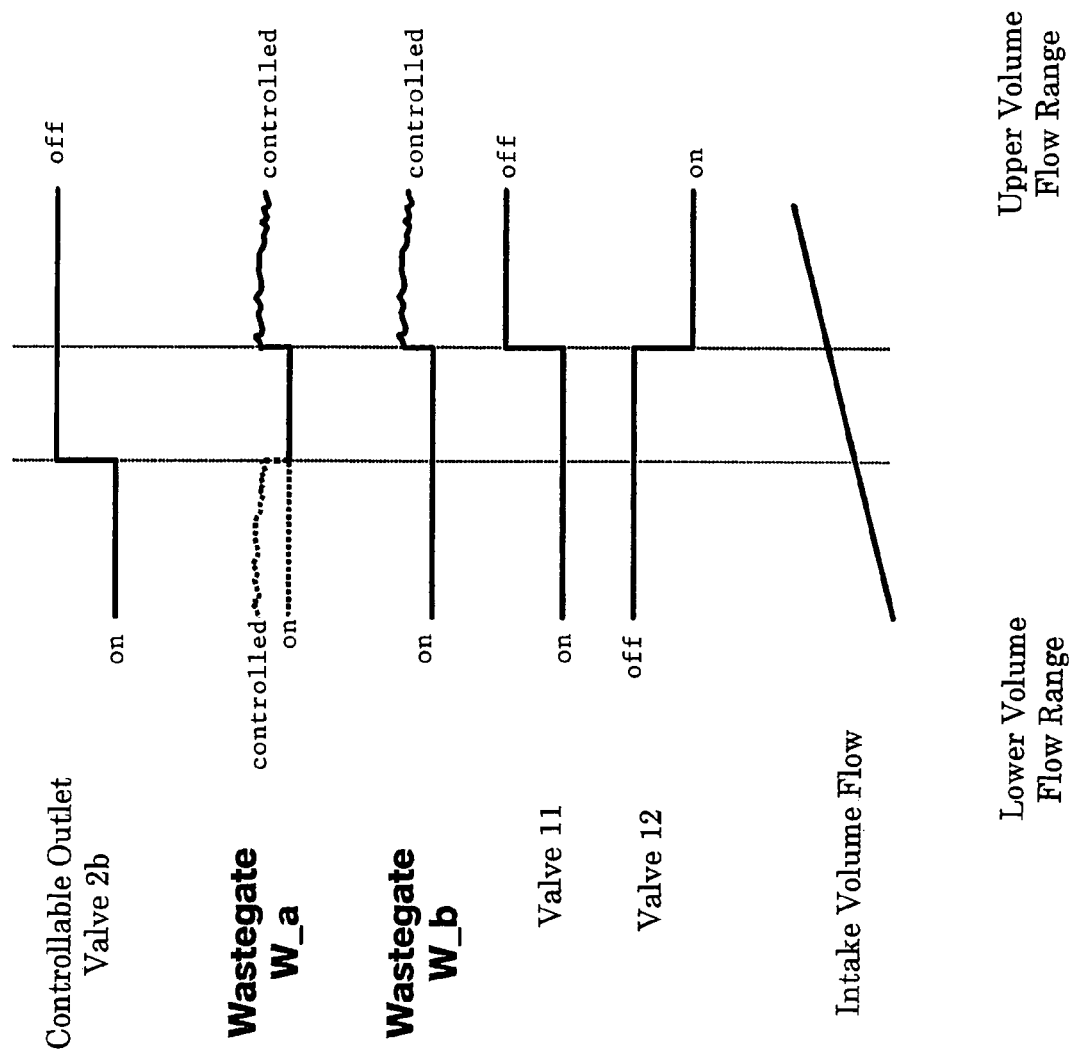
FIG. 2 illustrates the mode of action of the drive device, in particular the mode of action of the drive device in regard to a jolt-free transition between the mode of operation in the lower range of rotary speed (with only one active exhaust gas charger device) and the mode of operation in the upper range of rotary speed (with two active exhaust gas turbocharger devices).

The drive device according to FIG. 1 includes an internal combustion engine 2, which includes on the inlet side a suction device 4 with an intake manifold 4a having an integrated throttle 4b, via which fresh air is supplied to the internal combustion engine 2, and which includes on the outlet side an exhaust gas device 6, via which the exhaust gas flow to be conducted away is discharged to the environment. Furthermore, two exhaust gas turbocharger devices 8a, 8b are present. Each of the exhaust gas turbocharger devices 8a, 8b includes a controllable wastegate W_a, W_b in order to protect the charger devices against excessive rotary speed, among other things and, when in catalytic converter heating mode, to conduct the exhaust gas flow around the turbine for acoustic reasons and thus to reduce the noise arising due to driving the turbine.

The internal combustion engine 2 includes on the outlet side two outlet valves 2a, 2b per cylinder, where the first outlet valve 2a (or outlet valve drive) is driven as a non-controllable valve (valve is not variable with regard to its stroke or its stroke and its timing), and in particular is formed as a valve which is driven via a cam shaft, which is not displaceable, at least with regard to stroke or stroke and control timing. The second outlet valve 2b (or outlet valve drive) is formed as a valve that is variable with regard to its stroke or its stroke and its control timing, and in particular as a valve with variable control timing and variable valve strokes (for example, a valve with an electromagnetically actuable valve drive or as a valve with so-called Valvetronic* valve technology (*official BMW designation for the variable BMW valve drive)).

In another embodiment of the invention, both outlet valves 2a, 2b can, however, be formed as variable outlet valves that accordingly are driven differently. It is only important that with low intake volume flows (up to a predetermined threshold for intake volume flow), one outlet valve (or one outlet valve group) is kept closed for each cylinder and the entire exhaust gas flow is conducted away in each case via the respective other outlet valve (or the respective other outlet valve group) per cylinder and is fed to a common exhaust gas turbocharger device. Also, in the case of the catalytic converter heating operating state, the entire exhaust gas flow is conducted via an initial catalytic converter and principal catalytic converter in this manner.

In contrast to traditional exhaust gas systems, in which the outlet ducts (outlet opening in the cylinder that is opened or closed by the outlet valve) of all the outlet valves are conducted in common via an outlet duct (in particular an exhaust gas manifold), in accordance with the invention, there are at least two separate exhaust gas ducts 6a, 6b per cylinder. The outlet duct of the first outlet valve 2a is connected to the one exhaust gas duct 6a, and the second outlet valve 2b is connected to the other exhaust gas duct 6b. The exhaust gas ducts 6a, 6b, which are each connected to the outlet valves 2a, 2b of the same mode of action, are conducted into a common exhaust gas duct part, and are each fed to an exhaust gas turbocharger device 8a, 8b.

In the depicted exemplary embodiment, an internal combustion engine 2 with six individual cylinders is represented. Therein, the outlet duct of the first (non-controllable) outlet valve 2a of each one of the cylinders is conducted via a separate exhaust gas duct 6a and is connected to the turbine T_a of the first exhaust gas turbocharger device 8a. The outlet duct of the second (controllable) outlet valve 2b of each one of the cylinders is conducted via another separate exhaust gas duct 6b and is connected to the turbine T_b of the second exhaust gas turbocharger device 8b. In the depicted exemplary embodiment, the first outlet valves 2a of the cylinders are grouped into two groups of three outlet valves 2a each and each group is conducted via its own exhaust gas duct 6a to the first exhaust gas turbocharger group 8a.

The first exhaust gas turbocharger device 8a is, preferably, formed as a twin-scroll charger for low rotary speeds and thus low intake volume flows, while the second exhaust gas turbocharger device 8b is formed as a dynamic pressure charger for greater intake volume flows. The exhaust gas ducts 6a that are assigned to the invariable outlet valves 2a are conducted to the first exhaust gas turbocharger device 8a, while the exhaust gas ducts which are assigned to the variable outlet valves 2b are conducted to the second exhaust gas turbocharger device 8b. On the exhaust side, the turbine T_a of the first exhaust gas turbocharger device 8a is connected via a series circuit of an initial catalytic converter K1 and a principal catalytic converter K2 to the environment. The turbine T_b of the second exhaust gas turbocharger device 8b is only connected to the environment via the initial catalytic converter K2 with routing around the initial catalytic converter K1, coupled between the initial catalytic converter K1 and the principal catalytic converter K2.

To compress fresh intake air, the first exhaust gas turbocharger device 8a, with its compressor V_a, as well as the second exhaust gas turbocharger device 8b, with its compressor V_b, is disposed between a common suction noise suppressor AGD and the common intake manifold 4a in the intake tract of the internal combustion engine 2. In the depicted exemplary embodiment, a common charge air cooler LLK is, furthermore, disposed in front of the manifold 4a.

Furthermore, a control unit 10 is provided for driving the controllable outlet valves 2b. The control unit 10 controls the controllable outlet valves 2b as a function of the intake volume flow of the internal combustion engine 2. Below a predetermined limit for the intake volume flow, the controllable outlet valves 2b are held in a position which closes the corresponding exhaust gas duct 6b (closed position) while, upon reaching and exceeding the predetermined limit $M_{Grenz}$ (rotary speed $n_{Grenz}$) for the intake volume flow, the controllable outlet valves 2b are opened, or according to a load specification are moved back and forth between the open and closed positions.

The controllable outlet valves 2b may also be driven in the manner of the control unit 10 so that after a transient load pressure buildup with an intake volume flow below a predetermined threshold, the controllable outlet valves 2b are opened briefly or upon reaching the theoretical charge pressure.

Upon activation of the controllable outlet valves 2b in the transition from a lower into an upper volume flow range, the controllable outlet valves 2b are opened first. Thereupon, the exhaust gas mass flow is divided onto the exhaust gas conductors 6a and 6b. With this, the exhaust gas mass flow in the exhaust gas conductor 6a is less than before. In order to conduct the same absolute exhaust gas mass flow as before via the turbine T_a of the first exhaust gas turbocharger device 8a, a greater portion of the exhaust gas mass flow must be conducted from the exhaust gas conductor 6a via the turbine T_a. To do this, the wastegate W_a of the first exhaust gas turbocharger device 8a must be closed further at the same time as the activation of the controllable outlet valves 2b. Thus, the turbine capacity required for the current operation point of the first exhaust gas turbocharger device 8a continues to be adjusted and thus the change-over process is designed to be jolt free.

The second exhaust gas turbocharger device 8b includes a first controllable valve 11, which is upstream after the compressor wheel V_b (between the compressor wheel V_b and charge air cooler LLK). Furthermore, a second controllable valve 12 is provided between the output of the compressor wheel V_b and the valve 11, via which a volume flow can be discharged, essentially without additional resistance, to the environment or can be recycled to one of the compressor inputs in the air or gas circuit. Both valves 11, 12 may be driven via the control device 10. The first controllable valve 11 is kept closed during the change-over process until the second exhaust gas turbocharger device 8b has reached a rotary speed so high, that upon opening of the first valve 11, no traceable impact on pressure develops in front of the charge air cooler LLK.

Until the second exhaust gas turbocharger device 8b to be connected has reached a sufficiently high rotary speed, the second valve 12 is held in the open state. With this, the compressor V_b can build up a volume flow and does not convey towards the closed first valve 11. The volume flow over the second valve 12 is throttled so that a pressure can build up between the compressor V_b and the first valve 11. For this, the control device 10 is formed such that before the time of the opening of the first valve 11, the second valve 12 is driven such that a definite pressure buildup between the compressor outlet of the compressor V_b and the first valve 11 can occur. If the compressor V_b of the second exhaust gas turbocharger device 8b to be connected has reached the required rotary speed, then the first valve 11 is opened. With this, both exhaust gas turbochargers are active. If the first valve 11 is open, the second valve 12 is closed, so that the charge pressure is not built up over the second valve 12.

Of course, the drive according to the invention is particularly applicable to a motor vehicle.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A drive device for a motor vehicle, comprising:
    a multi-cylinder internal combustion engine, each cylinder including at least two outlet valves wherein at least one of the at least two outlet valves has a variable control stroke;
    at least two exhaust gas turbocharger devices;
    wherein at least one outlet valve of each cylinder is assigned to at least one of the two exhaust gas turbocharger devices such that an exhaust gas duct assigned to the one outlet valve is coupled to a turbine wheel of the one exhaust gas turbocharger device;
    wherein a compressor side on the output side of the exhaust gas turbocharger device, which on the intake side is connected by its turbine to the controllable outlet valves, a first controllable valve is assigned for closing the compressor outlet such that an outflow of intake air compressed via a compressor of the first exhaust gas turbocharger device, via the compressor of the second exhaust gas turbocharger device, is prevented;
    wherein on the compressor side on the output side of the first exhaust gas turbocharger device, which on the intake side is connected by its turbine to the controllable outlet valves, a second controllable valve is assigned for a controlled conducting away of the air compressed via the compressor of the second exhaust gas turbocharger device, and
    wherein a control unit is operatively configured such that, after opening the controllable outlet valves until reaching a predetermined rotary speed of the compressor of the second exhaust gas turbocharger device and/or until a predetermined period of time has elapsed after opening the controllable outlet valves, the first controllable valve is closed and the second controllable valve is opened.

2. The drive device according to claim 1, wherein the control unit is operatively configured such that, after reaching the predetermined rotary speed of the compressor of the second exhaust gas turbocharger device and/or until a predetermined period of time has elapsed after opening the controllable outlet valves, the first controllable valve is opened and the second controllable valve is closed.

3. The drive device according to claim 2, wherein the control unit is operatively configured such that before the time of the opening of the first valve, the second valve is driven such that a definite pressure buildup between the compressor outlet of the compressor and the first valve occurs.

* * * * *